United States Patent [19]

Hayashi

[11] 4,293,250
[45] Oct. 6, 1981

[54] APPARATUS FOR TRANSFERRING SOLIDS

[76] Inventor: Takeshi Hayashi, No. 85-3, Mitsuicho, Bezaiten, Muya-cho, Naruto-shi, Tokushima-ken, Japan

[21] Appl. No.: 101,793

[22] Filed: Dec. 10, 1979

[30] Foreign Application Priority Data

Dec. 8, 1978 [JP] Japan .............................. 53-152890

[51] Int. Cl.³ ............................................ B65G 53/30
[52] U.S. Cl. .................................... 406/109; 406/144
[58] Field of Search ............... 406/109, 144, 146, 122, 406/168, 169; 119/82

[56] References Cited

U.S. PATENT DOCUMENTS

| | | | |
|---|---|---|---|
| 2,714,533 | 8/1955 | Arquint | 406/169 X |
| 2,744,792 | 5/1956 | Finn | 406/169 X |
| 3,942,841 | 3/1976 | McCain et al. | 406/109 X |
| 3,942,842 | 3/1976 | Young | 406/168 X |

Primary Examiner—Robert B. Reeves
Assistant Examiner—Gene A. Church
Attorney, Agent, or Firm—Wenderoth, Lind & Ponack

[57] ABSTRACT

An apparatus for transferring solids is provided with a sealed chamber adapted to suck in and exhaust the solids together with a liquid transfer medium so as to transfer them. Air in the sealed chamber is exhausted by a decompressing means connected to the sealed chamber and thereby the solids are introduced into the sealed chamber with the use of air as a transfer medium. The sealed chamber is connected to a feeding means for feeding the sealed chamber with the liquid and to a transfer pump for discharging the liquid fed into the sealed tank together with the solids out of the sealed chamber.

10 Claims, 6 Drawing Figures

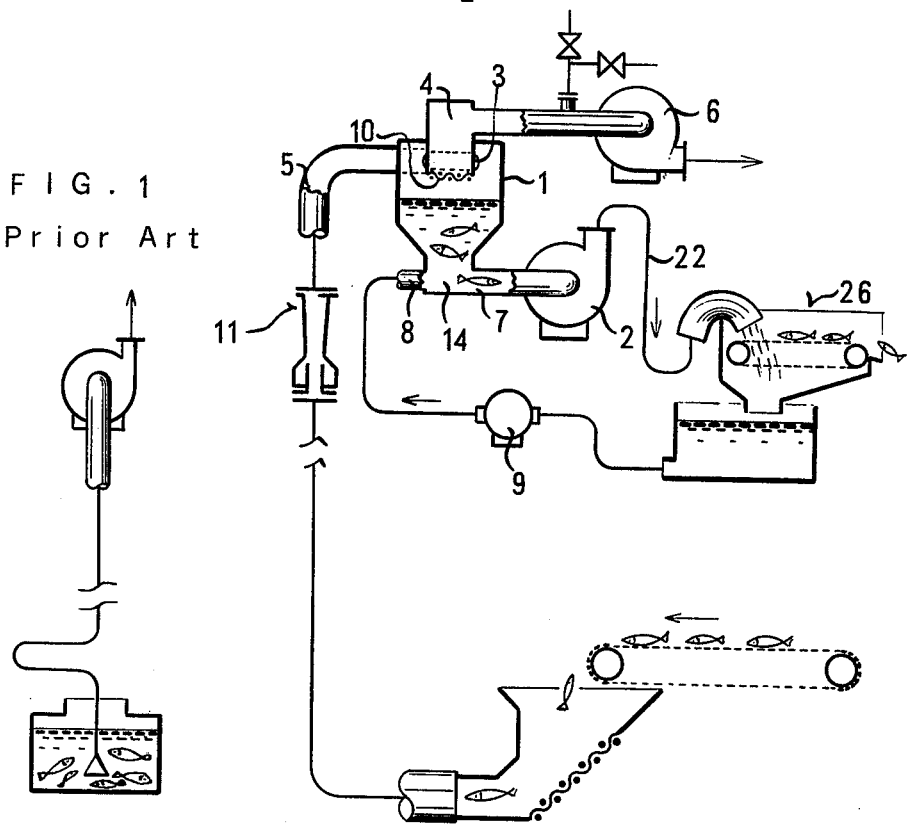
FIG. 2
FIG. 1
Prior Art
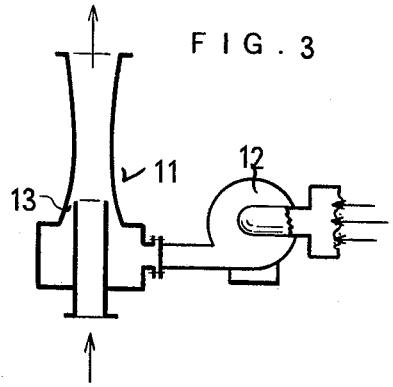
FIG. 3
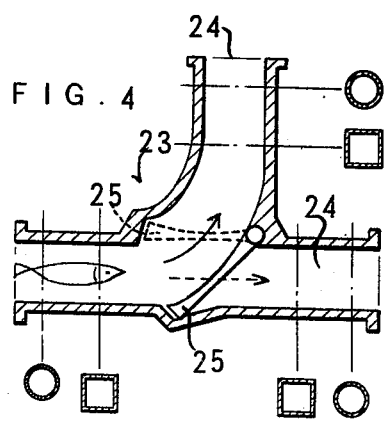
FIG. 4

APPARATUS FOR TRANSFERRING SOLIDS

The present invention relates to an apparatus for transferring solids such as fish, hams, sausages and the like with the use of a liquid transfer medium such as water or seawater.

BACKGROUND OF THE INVENTION AND PRIOR ART

The transfer or pumping up of solids such as fish in water as a transfer medium as shown in FIG. 1, a range of lift more than 10 m on the suction side is theoretically impossible. In practice, disadvantageously, it is impossible for a pump to have a range of lift as high as 10 m, and water can be forced to a maximum height of 7 or 8 m by a pump. Further, even with a lift range of less than 5 m, transfer power is lowered if the whole length of the suction pipe is large.

In using a pump adapted to accelerate a liquid flow by an impeller, a high range of lift on the suction side lowers the transfer power of the pump and further damages the solids to be transferred. Namely, if the range of lift on the suction side is high, suction force has to be increased, for example, by the speed up of the rotation of the impeller. But with such a high speed rotation of the impeller, the solids passing through the pump are subjected to a violent force by the impeller and are apt to be damaged.

If a transfer apparatus damages the solids to be transferred, the use of the apparatus is remarkably limited.

Such solids transfer apparatus is used to transport fish, sometimes live fish and the like. Consequently, the apparatus must not impart great shock to fish to be transferred at any stage of the operation. A great shock imparted to the fish transferred by a pump lowers the quality of the fish or kills the same.

OBJECTS AND BRIEF SUMMARY OF THE INVENTION

The present invention is developed in order to overcome these disadvantages. An apparatus for transferring solids according to the present invention comprises the combination of pneumatic transfer and hydraulic transfer of solids. By using pneumatic force, materials can be lifted up to a great height even with the use of low vacuum. According to the present invention taking advantage of such a merit thereof, solids to be transferred are sucked into a sealed chamber and then the solids and a liquid transfer medium are delivered out of the sealed chamber under low vacuum and discharged by a solids transfer pump.

An important object of the present invention is to provide an apparatus for transferring solids in which even with a wide range of lift, the decrease of the transfer power is remarkably small and the solids can be rapidly transferred to a high and/or remote place.

Another important object of the present invention is to provide an apparatus for transferring solids in which since an outlet opening through which the solids are delivered out of a sealed chamber opens into a liquid, air is prevented from returning into the sealed chamber, and further solids can be introduced into the sealed chamber only by exhausting air out of the sealed chamber with a decompressing means, thereby simplifying the whole structure of the apparatus and enabling a continuous transfer of the solids.

A further important object of the present invention is to provide an apparatus for transferring solids which can lift the solids to a high place without imparting any strong shock to the solids.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF EXPLANATION OF THE DRAWINGS

FIG. 1 is a sectional view of a conventional solids transfer pump in a used condition;

FIG. 2 is a sectional view of an embodiment of an apparatus for transferring solids according to the present invention;

FIG. 3 is a sectional view of an air ejector connected with an inlet pipe shown in FIG. 2;

FIG. 4 is a sectional view of a branch pipe; and

DETAILED DESCRIPTION OF THE INVENTION

Figure 5:
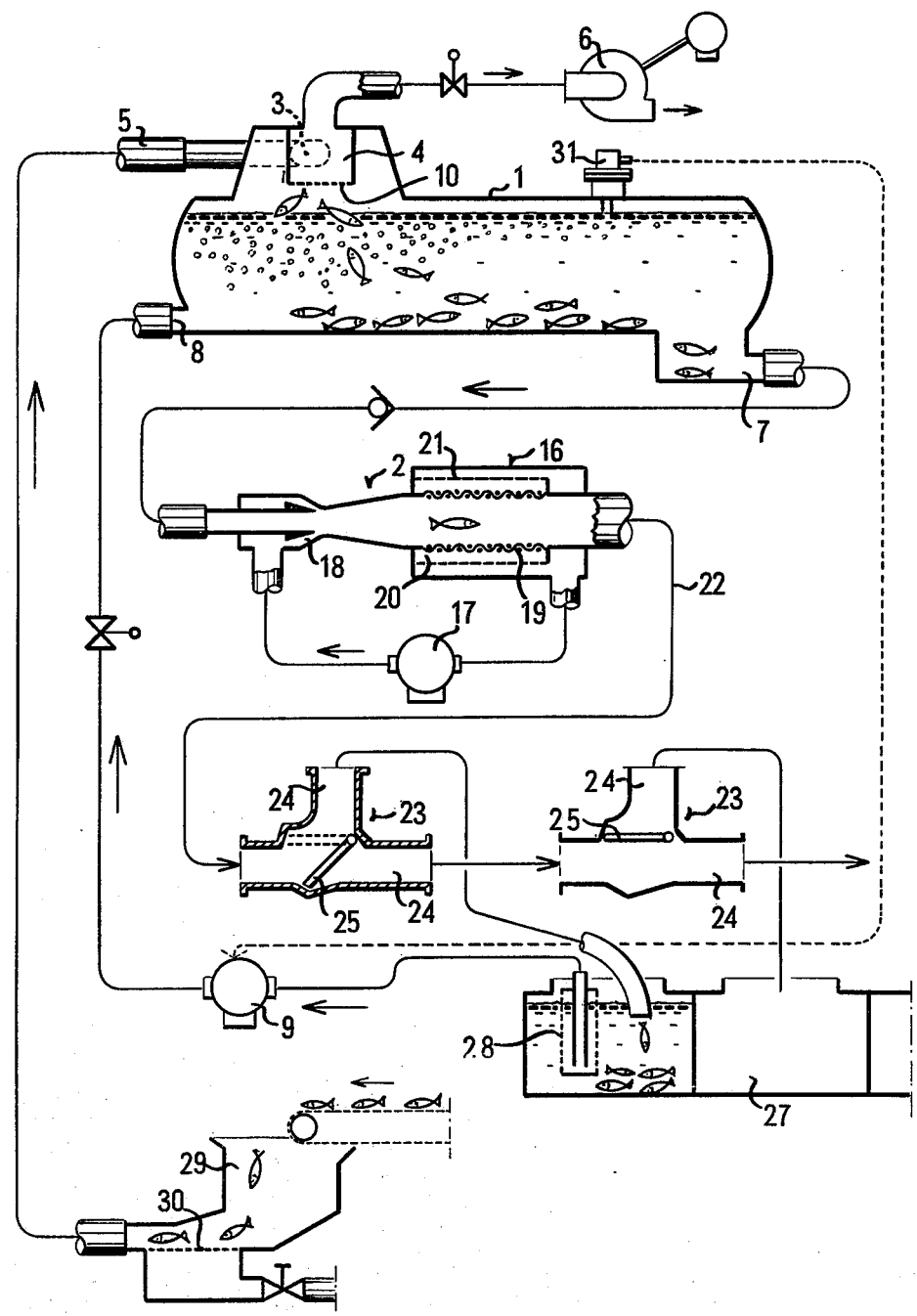
FIGS. 5 and 6 are sectional views of other embodiments of an apparatus for transferring solids according to the present invention.

An apparatus for transferring solids shown in FIG. 2 comprises a sealed chamber 1 of air-tight structure, a decompressing means for exhausting air out of the sealed chamber so that the solids can be introduced into the sealed chamber 1 together with air introduced thereinto, a feeding means for feeding the sealed chamber 1 with a liquid, and a solids transfer pump 2 for transferring the solids out of the sealed chamber 1 with the use of the liquid as a transfer medium.

The sealed chamber 1 is provided with an inlet opening 3 and an outlet opening 4. The inlet opening 3 is opened at a location above the liquid level in the sealed chamber 1, preferably at an upper portion of the sealed chamber 1 so that the solids and air can be smoothly introduced into the sealed chamber without passing through the liquid. And the outlet opening 4 is opened at a location above the liquid level in the sealed chamber 1 so that air in the chamber can be exhaust out. The inlet opening 3 is connected with an inlet pipe 5 while the outlet opening 4 is connected with the suction side of a blower 6 used as a decompressing means. On the other hand, a delivery opening 7 for delivering the solids and the liquid out of the chamber 1 is provided at the bottom of the sealed chamber and below the liquid level. The delivery opening 7 is connected with the suction side of the solids transfer pump 2. Further, at the bottom of the sealed chamber 1 and preferably below the liquid level, a water inlet opening 8 is provided. This water inlet opening 8 is connected with the exhaust side of a return pump 9 used as a water feeding means.

The inlet opening 3 and the outlet opening 4 are provided at the upper portion of the sealed chamber 1 in the form of a cyclone, so that the solids introduced together with air through the inlet opening 3 into the sealed chamber 1 can be dropped smoothly and without any strong shock into the liquid in the sealed chamber 1 and so that the exhaust air neither leads the solids outwardly nor hinders the solids from dropping into the liquid. In other words, the sealed chamber 1 is in the form of a cylinder which is circular in horizontal section, and the inlet opening is so opened that the connection part of the inlet pipe with the inlet opening is positioned in the direction of the tangential line of the sealed chamber 1, while the outlet opening 4 is provided in the vertical direction in the center of the sealed chamber 1.

In the abovementioned sealed chamber 1 provided with the inlet opening 3 and the outlet opening 4, similarly to a conventional cyclone, the solids introduced through the inlet opening 3 into the sealed chamber 1 are rotated along the inner surface of the sealed chamber 1 and drop into the liquid, and such drop of the solids is not hindered by the air flowing toward and through the outlet opening 4. The outlet opening 4 is preferably covered with a porous plate 10 through which water can pass but the solids cannot pass so as to prevent the solids from being led through the outlet opening 4 at any case. The outlet opening 4 for exhausting air out of the sealed chamber 1 is never provided at a location below the liquid level in the sealed chamber 1. On the other hand, the inlet opening 3 may be provided at a location below the liquid level in the sealed chamber 1.

Figure 6:
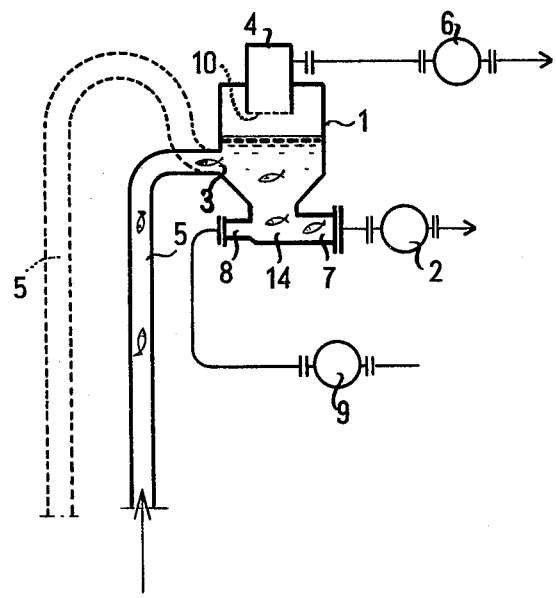

In FIG. 6, the inlet opening 3 is shown as opened into the liquid in the sealed chamber 1. In such a sealed chamber 1, the solids which has passed through the inlet pipe 5 are introduced together with air into the liquid in the sealed chamber 1 and smoothly reduced in speed, while the air introduced forms bubbles and rise up to be exhausted through the outlet opening 4. A sealed chamber 1 of such a structure can decrease the shock given to the solids when they are introduced into the sealed chamber 1 and hit against the inner surface of the sealed chamber 1. However, on stopping the operation of the blower, the liquid in the sealed chamber 1 returns through the inlet pipe 5. This trouble is overcome by bending the middle portion of the inlet pipe 5 so as to be located above the liquid level in the sealed chamber 1 as shown with broken line in FIG. 6.

In an apparatus for transferring solids according to the present invention, the range of lift on the suction side is further increased by connecting an air ejector 11 in the way of the inlet pipe 5 connected with the inlet opening 3. By means of the ejector 11, a high speed air stream ejected through a nozzle in the direction of the solids transfer can raise the speed of the solids passing through the inlet pipe 5. Therefore, the solids can be rapidly transferred if the inlet pipe is rather long and/or the solids are to be transferred to a high place.

As shown in FIG. 3, the ejector 11 is adapted to accelerate the flow of the solids by ejecting the compressed air introduced by an air pump 12 through a narrow nozzle 13, the nozzle 13 being opened around the outer circumferential surface of the inlet pipe and oriented in the direction of the solids transfer.

In a sealed chamber 1 shown in FIG. 2, the inlet opening 3 is positioned wholly above the liquid level in the sealed chamber. In such a sealed chamber 1, air incoming through the inlet pipe 5 is introduced without passing through the liquid and stored in the sealed chamber 1.

It is not necessary that the whole of the inlet opening 3 be positioned above the liquid level in the sealed chamber 1, and if a part of the opening 3 is above the liquid level, the lower part thereof may be opened in the liquid.

If the solids transferred with the use of water as a transfer medium are of such a specific gravity as makes them sink in water, like fish, hams and sausages, the delivery opening 7 is preferably positioned at the bottom of the sealed chamber 1 so that the solids settled down at the bottom of the sealed chamber 1 can be smoothly delivered therethrough. On the other hand, if the solids are of a specific gravity lower than that of water, like fruits for example, the delivery opening is preferably provided below the liquid level in the sealed chamber and at the uppermost possible position (not shown).

The water inlet opening 8 is preferably provided as opened toward the delivery opening 7 as shown in FIG. 1 so that water incoming through the opening 8 flows towards the delivery opening 7. As shown especially in FIG. 2, in a sealed chamber in which its bottom part has a downward tapered form to provide a reservoir 14 for the solids and the water inlet opening 8 and the delivery opening 7 are positioned on a same line and on the opposite sides of the reservoir 14, the solids can be delivered out of the sealed chamber smoothly or without being retained there and in regular order.

The sealed chamber 1 shown in FIG. 5 is in the form of a slender cylinder as a whole. In this sealed chamber 1, the inlet opening 3 and the outlet opening 4 are provided at the left upper end portion of the chamber 1, the water inlet opening 8 being opened at the left lower end portion so as to feed water toward the right end portion of the chamber 1, and the delivery opening 7 being opened at the right end portion of the chamber 1. In this sealed chamber 1, the liquid introduced through the water inlet opening 8 flows toward the delivery opening 7, and this liquid stream carry to the delivery opening 7 the solids fed through the inlet opening 3 into the sealed chamber 1 and settled down in the liquid, thus the solids being delivered smoothly and in regular order.

On the upper portion of the sealed chamber 1, there is provided a level switch 31 for keeping the liquid level constant which is adapted to control the operation of the return pump 9 or the solids transfer pump 2. If the liquid level becomes lower than the predetermined value, the level switch 31 detects this and operates the return pump 9 to raise the liquid level or stops the operation of the transfer pump 2 for stopping the delivery of the liquid and the solids till the liquid level is raised.

The decompressing means for exhausting air out of the sealed chamber 1 is preferably of a type of producing low pressure and a good airflow, and therefore is most suitably in the form of a turbo-blower or Root's blower.

The quantity of the solids introduced into the sealed chamber 1 in a unit time is preferably determined by a fixed quantity type feeder, for example, a belt feeder connected with the suction end of the inlet pipe 5 as shown in FIG. 2. This is because a fixed quantity type feeder does not feed the inlet pipe 5 with an excessive amount of solids at one time and therefore prevents the inlet pipe 5 from being clogged.

A fixed quantity type feeder may comprise a rotary feeder, a table feeder or a feeder adapted to be operated by an operator observing with eyes the quantity of the solids fed.

The speed of the solids transferred through the inlet pipe 5 is controlled by decreasing through a valve 32 etc. the displacement of the decompressing means per hour. The valve 32 is connected with the suction and/or exhaust side of the decompressing means i.e. the blower 6. In FIG. 2, the valve 32 is branched and connected with the suction side of the blower 6. By opening the valve 32 wide, the air introduced from outside by the blower 6 is increased in quantity and the substantial quantity of air exhausted out of the sealed chamber 1 is decreased. As the result, the speed of the solids transferred through the inlet pipe 5 is lowered.

Consequently, the flow rate of air passing through the inlet pipe 5 determined on consideration of the kind, size, weight, breakage strength and the like.

The solids transfer pump 2 may comprise any type of pump which can transfer solids together with a liquid as a transfer medium. The transfer pump 2 shown in FIG. 2 is a bladeless rotor pump in which an impeller having a spiral passage is rotated, while the transfer pump 2 shown in FIG. 5 is an ejector which ejects the liquid at high speed in the direction of the solids transfer.

The ejector is adapted to eject through a narrow nozzle 18 provided around the outer circumference of the pipe the liquid separated from the solids by a separator 16 connected to the pipe at a position downstream of the ejector and compressed by a pump 17.

The separator 16 is provided with a net cylinder 19 of a diameter equal to the inner diameter of the passage, and with a watertight warer chamber 20 defined around the net cylinder, a part of the water chamber 20 is opened and connected with the suction side of the pump 17. Around the net cylinder 19 there is provided a pressure equalizer 21 of a higher liquid penetration resistance than that of the net cylinder 19 so that the liquid can be more uniformly introduced through the whole net circumference of the net cylinder 19.

If the solids are required to be transferred to a plural number of locations, a branch pipe 23 is connected in the way of the transfer pipe 22 as shown in FIG. 5. The branch pipe 23 is provided with a closing element 25 at the boundary between the branched passages 24 which is adapted to close one of the branched passages through the pivotal movement thereof as shown in FIG. 4. The pivot of the closing element 25 is projected outside the branch pipe in such a manner as prevents any leakage of the liquid, and the transfer passage for the solids is changed-over by rotating the pivot. In order to smoothly transfer the solids along the surface of the closing element and change the direction of the blow to the solids, the closing element 25 is curved with a recess in the middle thereof, and further, the pipe is so formed as to have a rectangular section at the portion thereof to which the closing element 25 is pivoted and then changed in shape so as to have a circular section gradually in the direction far away from rectangular section.

As shown in FIG. 2, the return pump 9 may be connected with the separator 26 so as to suck the liquid separated from the solids by the separator 26 connected with the exhaust side of the transfer pump 2. Otherwise as shown in FIG. 5, the return pump 9 may be connected, through a water passable cylinder 28, with a fish bath 27 in which fish transferred together with water is stored, thereby the pump 9 returning the used liquid transfer medium to the sealed chamber 1. If the liquid transfer medium is recycled by the return pump 9 like this, the liquid can be repeatedly used and the liquid is scarcely flowed out or lost, thus the liquid level in the sealed chamber 1 is scarcely changed.

A hopper 29 shown in FIG. 5 is provided at the bottom thereof with a net clement 30 through which air flows into the inlet pipe 5, and by means of such air flow the solids can be introduced into the inlet pipe 5.

In the apparatus for transferring solids according to the present invention, air is exhausted out of the sealed chamber by the decompressing means, thereby air being introduced through the inlet pipe connected with the sealed chamber 1, this incoming air flow transferring the solids into the sealed chamber 1, at this stage of the operation the delivery opening for delivering the solids and the liquid being positioned in the liquid in the sealed chamber and filled with the liquid, furthermore the delivery opening being connected with the transfer pump by which the liquid is delivered. Consequently air is prevented from returning into the sealed chamber and the solids can be introduced into the sealed chamber only by exhausting air out of the sealed chamber with the use of the decompressing means.

In other words, according to the present invention, pneumatic transfer and hydraulic transfer of solids are combined under a limited condition so as to provide unique effects. Taking advantage of the pneumatic transfer affording a high range of lift of the solids using even a low vacuum, the solids are introduced into the sealed chamber, and then the solids and the liquid are efficiently transferred out of the low vacuum sealed chamber by means of the solids transfer pump.

Consequently, according to the present invention, the solids can be lifted to a height more than 10 m. Besides, the solids can be efficiently and rapidly transferred to a high and/or remote place without any lowering of the transfer power per a unit time. Further advantageously, since the sealed chamber is at a rather low vacuum, the solids can be efficiently and continuously delivered therefrom by the solids transfer pump.

What is claimed is:

1. An apparatus for transferring solids while preventing damage to such solids due to the shock of transfer comprising a sealed chamber of a water-tight structure, a decompressing means for exhausting air out of the sealed chamber, a feeding means for feeding to the sealed chamber a liquid transfer medium, and a solids transfer pump for transferring the solids together with said liquid out of the sealed chamber, in which the sealed chamber is provided with an inlet opening to which an inlet pipe is connected, an outlet opening positioned above the level of the liquid in the sealed chamber and to which the suction side of the decompressing means is connected, and a delivery opening for delivering solids therethrough positioned below the level of the liquid in the sealed chamber and communicating with the suction side of the solids transfer pump, and in which air is exhausted out of the sealed chamber by means of the decompressing means, and thereby solids being introduced through the inlet pipe into the sealed chamber, dropped in and mixed with the liquid stored in the sealed chamber, and then transferred together with the liquid as a transfer medium by the solids transfer pump to a predetermined location.

2. The apparatus for transferring solids as claimed in claim 1, in which the sealed chamber is in the form of a cyclone, and the inlet opening is positioned in the direction of the tangential line of the sealed chamber while the outlet opening is provided in the center of the sealed chamber.

3. The apparatus for transferring solids as claimed in claim 1, in which the outlet opening is covered with a porous plate.

4. The apparatus for transferring solids as claimed in claim 1, in which the delivery opening is provided at the bottom of the sealed chamber.

5. The apparatus for transferring solids as claimed in claim 1, in which the decompressing means comprises a blower.

6. The apparatus for transferring solids as claimed in claim 1, in which the feeding means comprises a return pump being connected with the exhaust side of the solids transfer pump, so that the liquid discharged by the solids transfer pump out of the sealed chamber is recycled into the sealed chamber.

7. The apparatus for transferring solids as claimed in claim 1, in which the solids transfer pump is a bladeless rotor pump in which an impeller having a spiral passage is rotated.

8. An apparatus for transferring solids as claimed in claim 1, in which the solids transfer pump is an ejector pump.

9. An apparatus for transferring solids as claimed in claim 1, in which an air ejector is connected to the inlet pipe.

10. An apparatus for transferring solids as claimed in claim 1, in which a feeding means adapted to feed a given amount of solids is connected to the suction end of the inlet pipe.

* * * * *